United States Patent
Tanaka et al.

(10) Patent No.: US 7,282,163 B2
(45) Date of Patent: Oct. 16, 2007

(54) RESISTOR PASTE, RESISTOR, AND ELECTRONIC DEVICE

(75) Inventors: Hirobumi Tanaka, Chuo-ku (JP); Katsuhiko Igarashi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 352 days.

(21) Appl. No.: 10/535,890

(22) PCT Filed: Nov. 21, 2003

(86) PCT No.: PCT/JP03/14886

§ 371 (c)(1),
(2), (4) Date: May 23, 2005

(87) PCT Pub. No.: WO2004/047124

PCT Pub. Date: Jun. 3, 2004

(65) Prior Publication Data

US 2006/0052229 A1 Mar. 9, 2006

(30) Foreign Application Priority Data

Nov. 21, 2002 (JP) .............................. 2002-337677

(51) Int. Cl.
*H01B 1/08* (2006.01)
*H01B 1/16* (2006.01)
(52) U.S. Cl. .................. 252/518.1; 338/22 R
(58) Field of Classification Search ............. 252/518.1, 252/519.13; 338/22 R
See application file for complete search history.

(56) References Cited

U.S. PATENT DOCUMENTS 5,491,118 A * 2/1996 Hormadaly ................ 501/20

(Continued)

FOREIGN PATENT DOCUMENTS

JP A 60-92601 5/1985

(Continued)

*Primary Examiner*—Mark Kopec
(74) *Attorney, Agent, or Firm*—Oliff & Berridge, PLC

(57) ABSTRACT

A resistor paste comprised of a first glass composition substantially not including lead, a second glass composition substantially not including lead of a composition different from the first glass composition, and a conductive material substantially not including lead mixed with an organic vehicle, further including CuO as an additive in addition to the first glass composition and second glass composition. The first glass composition includes ZnO in an amount of at least 10 mol % and at least one component selected from CaO, SrO, and BaO in an amount of less than 10 mol % (including 0), the second glass composition includes MnO in an amount of at least 5 mol % and at least one component selected from CaO, SrO, and BaO in an amount of at least 10 mol %, and the total percent by volume of the first glass composition and second glass composition is 65 to 89 vol % when the volume of the powder of the total of the conductive material, first glass composition, second glass composition, and additives is 100 and the percent by volume of the conductive material is 8 to 33 vol %. According to the present invention, it is possible to provide a lead-free resistor paste suitable for obtaining a resistor having a predetermined low resistance value while being excellent in the temperature coefficient of resistance (TCR) of resistance value and reliability characteristic (flux resistance) when for example formed on a dielectric substrate having barium titanate as a main ingredient.

18 Claims, 1 Drawing Sheet

U.S. PATENT DOCUMENTS 5,645,765 A * 7/1997 Asada et al. ........... 252/519.51

FOREIGN PATENT DOCUMENTS

| | | |
|---|---|---|
| JP | A 61-67901 | 4/1986 |
| JP | A 04-196104 | 7/1992 |
| JP | A 04-196105 | 7/1992 |
| JP | A 08-250829 | 9/1996 |
| JP | A 08-253342 | 10/1996 |
| JP | A 10-224004 | 8/1998 |
| JP | A 11-251105 | 9/1999 |
| JP | A 2001-196201 | 7/2001 |
| JP | A 2002-198203 | 7/2002 |

* cited by examiner

RESISTOR PASTE, RESISTOR, AND ELECTRONIC DEVICE

TECHNICAL FIELD OF THE INVENTION

The present invention relates to a resistor paste, a resistor, and an electronic device.

BACKGROUND ART

A resistor paste is generally mainly comprised of a glass material, conductive materials, and an organic vehicle (binder and solvent). The glass material is included in the resistor paste for adjusting the resistance value and for imparting bondability to the substrate etc. The resistor paste is printed on a substrate, then fired to form a thick film (5 to 25 µm) resistor.

Most conventional resistor pastes include lead oxide-based glass as the glass material and contain ruthenium oxide or a compound of the ruthenium oxide and lead as a conductive material and therefore are lead-containing pastes.

However, use of a lead-containing resistor paste is not desirable from the viewpoint of environmental pollution, so various proposals have been made regarding lead-free thick film resistor pastes (for example, see the following shown Patent Document 1, Patent Document 2, and Patent Document 3).

Normally, in thick film resistors, even if formed by the same conditions (printing and firing conditions), the characteristics (resistance value, TCR (temperature coefficient of resistance), reliability characteristic, etc.) will not match due to the substrate used. To obtain the necessary characteristics, it is sufficient to use resistors developed for the individual substrates.

As the reason why the characteristics are not constant due to the substrate used, generally the difference in the linear heat expansion coefficients of the substrates is discussed. However, when using a dielectric substrate having $BaTiO_3$ as a main ingredient as with chip capacitor devices, isolator devices, etc., the dielectric substrate and resistor react in the firing process. As a result, there is the problem that the resistance value rises and the TCR and reliability characteristic deteriorate (for example, see Patent Document 4). In particular, obtaining the desired characteristics in a resistor having a low resistance value of about 10 to 300 Ω/□ was extremely difficult.

Patent Document 1 Japanese Patent Publication (A) No. 8-253342

Patent Document 2 Japanese Patent Publication (A) No. 10-224004

Patent Document 3 Japanese Patent Publication (A) No. 11-251105

Patent Document 4 Japanese Patent Publication (A) No. 60-92601

DISCLOSURE OF THE INVENTION

The present invention was made in consideration of this situation. An object of the present invention is to provide a lead-free resistor paste suitable for obtaining a resistor having a predetermined low resistance value while being excellent in temperature coefficient of resistance (TCR) of the resistance value and reliability characteristic (flux resistance) when for example formed on a dielectric substrate having barium titanate as a main ingredient, a resistor formed from the resistor paste, and an electronic device having that resistor.

Conversion to Percent by Volume

To obtain the above object, the resistor paste according to the present invention is a resistor paste comprised of a first glass composition substantially not including lead, a second glass composition substantially not including lead of a composition different from the first glass composition, and a conductive material substantially not including lead mixed with an organic vehicle, characterized in that:

the resistor paste further includes CuO as an additive other than the first glass composition and the second glass composition, the first glass composition includes ZnO in an amount of at least 10 mol % and at least one component selected from CaO, SrO, and BaO in an amount of less than 10 mol %, the second glass composition includes MnO in an amount of at least 5 mol % and at least one component selected from CaO, SrO, and BaO in an amount of at least 10 mol %, and the total percent by volume of the first glass composition and second glass composition is 65 to 89 vol % when the volume of the powder of the total of the conductive material, first glass composition, second glass composition, and additives is 100, and the percent by volume of the conductive material is 8 to 33 vol %.

Preferably, the first glass composition includes ZnO in an amount of at least 10 mol % and not more than 40 mol %, $B_2O_3$ in an amount of at least 1 mol % and not more than 40 mol %, $SiO_2$ in an amount of at least 15 mol % and not more than 60 mol %, at least one compound selected from CaO, SrO, and BaO in an amount of less than 10 mol % (including 0), and a total of any other first oxides in an amount of not more than 30 mol % (including 0), and the second glass composition includes MnO in an amount of at least 5 mol % and not more than 20 mol %, at least one compound selected from CaO, SrO, and BaO in an amount of at least 10 mol % and not more than 40 mol %, $B_2O_3$ in an amount of at least 5 mol % and not more than 40 mol %, $SiO_2$ in an amount of at least 15 mol % and not more than 55 mol %, and a total of any other second oxides in an amount of not more than 20 mol % (including 0).

Preferably, the ratio by volume of the first glass composition and the second glass composition included in the resistor paste is 8:2 to 2:8.

Preferably, the paste further includes CuO as an additive other than the first glass composition and second glass composition, and a percent of addition by volume of CuO to the volume of the powder of the total of the conductive material, first glass composition, second glass composition, and additives is over 0 vol % and not more than 5 vol %.

Preferably, the paste further includes $MnO_2$ and/or $TiO_2$ as the additive, and a percent of addition by volume of $MnO_2$ and/or $TiO_2$ is at least 0 vol % and not more than 5 vol % with respect to the volume of the powder of the total of the conductive material, first glass composition, second glass composition, and additives.

Preferably, the paste contains CuO in an amount of at least 1 vol % and not more than 3 vol % and $MnO_2$ in an amount of at least 0 vol % and not more than 5 vol % with respect to the volume of the powder of the total of the conductive material, first glass composition, second glass composition, and additives.

Conversion to Percent by Weight

To obtain the above object, the resistor paste according to the present invention is a resistor paste comprised of a first glass composition substantially not including lead, a second glass composition substantially not including lead of a composition different from the first glass composition, and a conductive material substantially not including lead mixed with an organic vehicle, characterized in that:

the resistor paste further includes CuO as an additive other than the first glass composition and the second glass composition, the first glass composition includes ZnO in an amount of at least 10 mol % and at least one component selected from CaO, SrO, and BaO in an amount of less than 10 mol %, the second glass composition includes MnO in an amount of at least 5 mol % and at least one component selected from CaO, SrO, and BaO in an amount of at least 10 mol %, and the total percent by weight of the first glass composition and second glass composition is 41.55 to 77.37 wt % when the weight of the powder of the total of the conductive material, first glass composition, second glass composition, and additives is 100 and the percent by weight of the conductive material is 18.41 to 55.36 wt %.

Preferably, the first glass composition includes ZnO in an amount of at least 10 mol % and not more than 40 mol %, $B_2O_3$ in an amount of at least 1 mol % and not more than 40 mol %, $SiO_2$ in an amount of at least 15 mol % and not more than 60 mol %, at least one compound selected from CaO, SrO, and BaO in an amount of less than 10 mol % (including 0), and a total of any other first oxides in an amount of not more than 30 mol % (including 0), and the second glass composition includes MnO in an amount of at least 5 mol % and not more than 20 mol %, at least one compound selected from CaO, SrO, and BaO in an amount of at least 10 mol % and not more than 40 mol %, $B_2O_3$ in an amount of at least 5 mol % and not more than 40 mol %, $SiO_2$ in an amount of at least 15 mol % and not more than 55 mol %, and a total of any other second oxides in an amount of not more than 20 mol % (including 0).

Preferably, the ratio by weight of the first glass composition and the second glass composition included in the resistor paste is 7.8:2.2 to 1.8:8.2.

Preferably, the paste further includes CuO as an additive other than the first glass composition and second glass composition, and a percent of addition by weight of CuO to the weight of the powder of the total of the conductive material, first glass composition, second glass composition, and additives is 0 to 4.23 wt % (excluding 0 wt %).

Preferably, the paste further includes $MnO_2$ and/or $TiO_2$ as the additive, and a percent of addition by weight of $MnO_2$ and/or $TiO_2$ is 0 to 7.25 wt % with respect to the weight of the powder of the total of the conductive material, first glass composition, second glass composition, and additives.

Preferably, the paste contains CuO in an amount of 1.71 to 3.59 wt % and $MnO_2$ in an amount of 0 to 7.25 wt % with respect to the weight of the powder of the total of the conductive material, first glass composition, second glass composition, and additives.

Common Matter

Preferably, the any other first oxides in the first glass composition is at least one oxide selected from $Al_2O_3$, $Na_2O$, $K_2O$, $ZrO_2$, MgO, $Bi_2O_3$, $P_2O_5$, $TiO_2$, CuO, CoO, and $V_2O_5$ and in that the total of the first oxides is not more than 29 mol % (including 0) with respect to the mol % of the first glass composition with respect to the whole.

Preferably, the any other second oxides in the second glass composition is at least one oxide selected from $Al_2O_3$, $ZrO_2$, ZnO, MgO, $Bi_2O_3$, $TiO_2$, CuO, CoO, and $V_2O_5$ and in that the total of the second oxides is not more than 20 mol % (including 0) with respect to the total mol % of the second glass composition.

Preferably, the conductive material is $RuO_2$ or a compound oxide of Ru.

Preferably, a ratio by weight of the weight of the powder of the total of the conductive material, first glass composition, second glass composition, and additives and organic vehicle is within a range of 1:0.25 to 1:4.

The resistor of the present invention is formed using the resistor paste. The electronic device of the present invention has the resistor. The electronic device is not particularly limited, but may be suitably used for an isolator.

In the present invention, "substantially not including lead" means not including lead over an amount which cannot be said to be the level of an impurity. An amount of the level of an impurity (for example, a content in the glass material or conductive material of not more than 0.05 wt %) may be contained. Lead sometimes is contained in an extremely small amount as an unavoidable impurity.

BEST MODE FOR CARRYING OUT THE INVENTION

Figure 1:
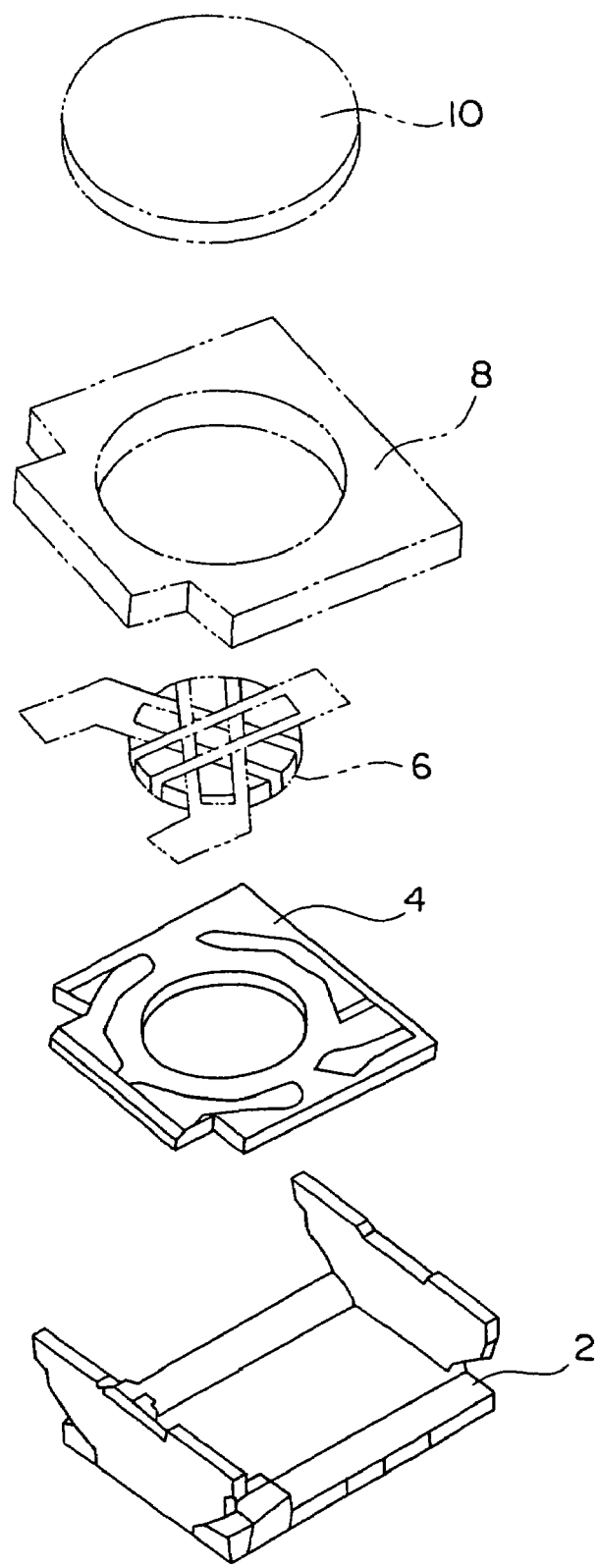
FIG. 1 is a disassembled perspective view of an isolator device as an electronic device having a resistor according to an embodiment of the present invention. The notations in FIG. 1 are as follows. 2 . . . resin case, 4 . . . capacitor substrate, 6 . . . ferrite assembly, 8 . . . holding resin plate, 10 . . . magnet.

Below, the present invention will be explained based on the embodiments shown in the drawings.

As shown in FIG. 1, an isolator device has a resin case 2, a capacitor substrate 4 housed inside it, a ferrite assembly 6 placed on top of the substrate 4, a holding resin plate 8 holding this from above, a magnet 10 placed on top, and a lid member (not shown) covering this from above.

In the embodiments, the capacitor substrate 4 in the isolator device is comprised of for example barium titanate or another dielectric ceramic. The surface is formed with a resistor by thick film printing. The resistor paste for forming the resistor is comprised of the resistor paste of the present invention.

The resistor paste of the present invention is a resistor paste comprised of a first glass composition substantially not including lead, a second glass composition substantially not including lead of a composition different from the first glass composition, and a conductive material substantially not including lead mixed with an organic vehicle. The conductive material is for example $RuO_2$ or a compound oxide of Ru.

The first glass composition includes ZnO in an amount of at least 10 mol %, preferably at least 10 mol % and not more than 40 mol %, $B_2O_3$ in an amount of at least 1 mol % and not more than 40 mol %, $SiO_2$ in an amount of at least 15 mol % and not more than 60 mol %, at least one compound selected from CaO, SrO, and BaO in an amount of less than 10 mol % (including 0), and a total of any other first oxides in an amount of not more than 30 mol % (including 0).

If the first glass composition contains ZnO in an amount less than 10 mol %, a reaction with the substrate ends up being promoted, so the resistance value and reliability characteristic of the resistor obtained deteriorate as a tendency. Further, if the ratio of composition of ZnO is too great, the chemical durability of the glass falls, so the reliability characteristic of the resistor deteriorates as a tendency.

$B_2O_3$ is preferably contained in the first glass composition from the viewpoint of improving the glass formability, but if too great, the chemical durability of the glass declines, so the reliability characteristic of the resistor deteriorates as a tendency.

$SiO_2$ is preferably contained in the first glass composition from the viewpoint of improving the glass formability, but if too great, the softening point of the glass becomes higher, sufficient sintering is not possible under ordinary resistor firing conditions, and the resistance value and reliability characteristic of the resistor deteriorate as a tendency.

The CaO, SrO, and BaO may be included for improving the chemical durability of the glass and for improving the reliability characteristic of the resistor, but if too great, a reaction with the substrate ends up being promoted, so the resistance value and reliability characteristic of the resistor deteriorate.

Further, if the total of the any first oxides is too great, the chemical durability of the glass deteriorates and the reliability characteristic and other reliability of the resistor deteriorates.

The second glass composition includes MnO in an amount of at least 5 mol %, preferably at least 5 mol % and not more than 20 mol %, at least one compound selected from CaO, SrO, and BaO in an amount of at least 10 mol %, preferably at least 10 mol % and not more than 40 mol %, $B_2O_3$ in an amount of at least 5 mol % and not more than 40 mol %, $SiO_2$ in an amount of at least 15 mol % and not more than 55 mol %, and a total of any other second oxides in an amount of not more than 20 mol % (including 0).

In the second glass composition, if the MnO is less than 5 mol %, the temperature coefficient of resistance of the obtained resistor deteriorates as a tendency. Further, if the ratio of composition of the MnO is too great, a reaction with the substrate is promoted, so the resistance value and reliability characteristic deteriorate.

If the at least one compound selected from CaO, SrO, and BaO is less than 10 mol %, the chemical durability of the glass drops and the reliability deteriorates as a tendency, while if too great, a reaction with the substrate ends up being promoted, so the resistance value and reliability characteristic deteriorate.

$B_2O_3$ is preferably contained in the second glass composition from the viewpoint of improving the glass formability, but if too great, the chemical durability of the glass declines, so the reliability characteristic of the resistor deteriorates as a tendency.

$SiO_2$ is preferably contained in the second glass composition from the viewpoint of improving the glass formability, but if too great, the softening point of the glass becomes higher, sufficient sintering is not possible under ordinary resistor firing conditions, and the resistance value and reliability characteristic of the resistor deteriorate as a tendency.

Further, if the total of the any second oxides is too great, the chemical durability of the glass deteriorates and the reliability characteristic and other reliability of the resistor deteriorates.

The total percent by volume of the first glass composition and second glass composition is 65 to 89 vol % when the volume of the powder of the total of the conductive material, first glass composition, second glass composition, and additives is 100, and the percent by volume of the conductive material is 8 to 33 vol %. The ratio by volume of the first glass composition and the second glass composition included in the resistor paste is preferably 8:2 to 2:8.

The total percent by weight of the first glass composition and second glass composition is 41.55 to 77.37 wt % when the weight of the powder of the total of the conductive material, first glass composition, second glass composition, and additives is 100 and the percent by weight of the conductive material is 18.41 to 55.36 wt %. The ratio by weight of the first glass composition and the second glass composition included in the resistor paste is preferably 7.8:2.2 to 1.8:8.2.

If the total of addition by volume or the total addition by weight of the first glass composition and the second glass composition is too small, the reliability of the resistor falls remarkably and the reliability characteristic deteriorates as a tendency, while if too great, the resistance value becomes too large as a tendency. Further, if the percent by volume or percent by weight of the conductive material is too small, the resistance becomes larger as a tendency, while conversely if too great, the reliability of the resistor remarkably falls and the reliability characteristic deteriorates as a tendency.

If the ratio by volume or ratio by weight of the first glass composition and second glass composition included in the resistor paste is outside the above scope, the temperature coefficient of resistance deteriorates and the reliability characteristic deteriorates as a tendency.

Further, the resistor paste further includes CuO as an additive other than the first glass composition and second glass composition.

The percent of addition by volume of CuO to the volume of the powder of the total of the conductive material, first glass composition, second glass composition, and additives is preferably over 0 vol % to not more than 5 vol %, more preferably 1 vol % or more to not more than 3 vol %.

The percent of addition by weight of CuO with respect to the weight of the powder of the total of the conductive material, first glass composition, second glass composition, and additives is preferably 0 to 4.23 wt % (excluding 0 wt %), more preferably 1.71 to 3.59 wt %.

If the percent of addition by volume or the percent of addition by weight of the CuO is too low, the reliability characteristic deteriorates as a tendency, while if too great, the temperature coefficient of resistance of the resistor deteriorates as a tendency.

Further, the resistor paste further contains $MnO_2$ and/or $TiO_2$ as an additive.

The percent of addition by volume of $MnO_2$ and/or $TiO_2$ is at least 0 vol % and not more than 5 vol % with respect to the volume of the powder of the total of the conductive material, first glass composition, second glass composition, and additives, preferably the $MnO_2$ is 0 vol % or more to not more than 5 vol %.

The percent of addition by weight of $MnO_2$ and/or $TiO_2$ is preferably 0 to 7.25 wt % with respect to the weight of the powder of the total of the conductive material, first glass composition, second glass composition, and additives, preferably the $MnO_2$ is 0 to 7.25 wt %.

By adding these oxides to the resistor paste as additives other than the glass ingredients, it is possible to adjust the resistance value and the temperature coefficient of resistance, but if too great, the reliability characteristic deteriorates as a tendency. Note that as additives other than the glass ingredients, besides CuO, $MnO_2$ and $TiO_2$, $Mn_3O_4$, ZnO, MgO, $V_2O_5$, $V_2O_3$, $Nb_2O_5$, $Cr_2O_3$, $Fe_2O_3$, CoO, $Al_2O_3$, $ZrO_2$, $SnO_2$, $HfO_2$, $WO_3$, and $Bi_2O_3$ may be mentioned.

The any other first oxides in the first glass composition is at least one oxide selected from $Al_2O_3$, $Na_2O$, $K_2O$, $ZrO_2$, $MgO$, $Bi_2O_3$, $P_2O_5$, $TiO_2$, $CuO$, $CoO$, and $V_2O_5$. The total of the first oxides is not more than 29 mol % (including 0) with respect to the mol % of the first glass composition with respect to the whole.

By including these oxides, the characteristics of the glass (softening point and chemical durability) can be adjusted and a resistor having any characteristics can be obtained, but if the content is too great, the characteristics and reliability of the resistor decline.

Further, the any other second oxides in the second glass composition is at least one oxide selected from $Al_2O_3$, $ZrO_2$, $ZnO$, $MgO$, $Bi_2O_3$, $TiO_2$, $CuO$, $CoO$, and $V_2O_5$. The total of the second oxides is not more than 20 mol % (including 0) with respect to the total mol % of the second glass composition.

By including these oxides, the characteristics of the glass (softening point and chemical durability) can be adjusted and a resistor having any characteristics can be obtained, but if the content is too great, the characteristics and reliability of the resistor decline.

Further, the weight ratio of the weight of the powder of the total of the conductive material, first glass composition, second glass composition, and additives and the organic vehicle is in the range of 1:0.25 to 1:4. This is to adjust the viscosity of the resistor paste.

The resistor paste is for example fabricated as follows:

First, the first glass composition and the second glass composition are prepared. To prepare these glass compositions, $ZnO$, $B_2O_3$, $SiO_2$, $CaCO_3$, $MnO$, $Al_2O_3$, $ZrO_2$, and various oxides (the above first oxides and second oxides) are weighed in predetermined amounts, mixed by a ball mill, and dried. The obtained powder is raised in temperature to 1000 to 1500° C. at a rate of temperature rise of for example 5 to 30° C./min, then held at that temperature for 0.5 to 5 hours (arbitrary), then the result is dropped into water so as to rapidly cool and glassify it. The obtained glassified material is pulverized by a ball mill to obtain the first glass composition or second glass composition comprised of the glass powder. These glass compositions are amorphous.

Next, the organic vehicle is prepared. The organic vehicle is not particularly limited, but for example as a binder resin, ethyl cellulose, polyvinyl butyral, methacrylic resin, butyl methacrylate, etc. may be used. Further, as the solvent, terpineol, butyl carbitol, butyl carbitol acetate, toluene, alcohols, xylene, etc. may be used. The organic vehicle may be prepared by adding and stirring in the solvent and dissolving the binder resin.

As the additives included in addition to the first glass composition and second glass composition, $CuO$, $MnO_2$, and/or $TiO_2$ may be mentioned. These additives are weighed to give the desired compositions together with the powder of the conductive material, the powder of the first glass composition, the powder of the second glass composition, and the organic vehicle and kneaded with them by a three roll mill etc. to obtain the resistor paste.

The ratio by weight of the total weight of the conductive powder and powder of the glass composition, additives, etc. and the organic vehicle is adjusted within the range by ratio of weight of 1:0.25 to 1:4 to prepare the paste so that the obtained paste has a viscosity suitable for screen printing.

To form a resistor on a dielectric substrate having $BaTiO_3$ as a main ingredient in a predetermined pattern using this resistor paste, it is for example sufficient to use screen printing or another thick film printing method. The firing temperature of the resistor paste is preferably 800 to 900° C. The holding time is preferably 5 to 15 minutes.

Note that the present invention is not limited to the above embodiments and can be changed in various ways within the scope of the present invention.

For example, the electronic device using the resistor paste and resistor of the present invention is not limited to the illustrated isolator and may also be used for a multilayer chip capacitor, C—R compound device, other module device, or other electronic device.

EXAMPLES

Below, the present invention will be explained based on further detailed examples, but the present invention is not limited to these examples.

Example 1

Resistor pastes were prepared by lead-free conductive materials and glass compositions. These were fired on dielectric substrates to prepare thick film resistors which were then measured for resistance values.

As the glass compositions, borosilicate-based glasses were used, while as the conductive material, $RuO_2$ was used.

(Preparation of Glass Composition)

Each first glass composition was obtained by weighing predetermined amounts of $ZnO$, $B_2O_3$, $SiO_2$, $CaCO_3$, $SrCO_3$, $BaCO_3$, and various oxides (any first oxides) mixing by a ball mill, and drying. The obtained powder was poured into a platinum crucible and raised in temperature in the air at a rate of 5° C./min to 1300° C. This temperature was held for 1 hour, then the result was dropped into water to rapidly cool and glassify it. The obtained glassified material was pulverized by a ball mill to obtain the first glass composition powder.

Each second glass composition was obtained by weighing predetermined amounts of $MnO$, $B_2O_3$, $SiO_2$, $CaCO_3$, $SrCO_3$, $BaCO_3$, and various oxides (any second oxides), mixing by a ball mill, and drying, then further treated by the same method as with the first glass composition to obtain the second glass composition powder.

These glass composition powders were examined by XRD. As a result, they were confirmed to be amorphous.

The obtained first glass compositions and second glass compositions are shown in the following Table 1. As shown in Table 1, as the first glass compositions, the glass compositions of Sample Nos. A1 to A5 were prepared. As the second glass compositions, the glass compositions of Sample Nos. B1 to B9 were prepared. The ratios of composition (mol %) are shown in Table 1.

Note that the first glass compositions of Sample Nos. A5 and A7 to A9 all have $ZnO$ in amounts of less than 10 mol %, so are outside the scope of the present invention. Further, the second glass composition of Sample No. B9 has $MnO$ in an amount of less than 5 mol %, so is outside the scope of the present invention. In Table 1, the samples outside the scope of the present invention are marked with asterisks.

TABLE 1

Ratio of composition (mol%)

First glass sample no.

- A1  $ZnO:B_2O_3:SiO_2:Al_2O_3:Na_2O:K_2O:(MgO, Bi_2O_3, etc.) = 10:1:60:6:11:8:4$
- A2  $ZnO:B_2O_3:SiO_2:ZrO_2 = 30:40:25:5$
- A3  $ZnO:B_2O_3:SiO_2:Al_2O_3:MnO = 30:35:20:5:10$
- A4  $ZnO:B_2O_3:SiO_2:Al_2O_3:(P_2O_5, TiO_2, CuO, CoO, V_2O_5, etc.) = 40:30:15:5:10$
- *A5  $ZnO:B_2O_3:SiO_2:CaO:Al_2O_3 = 5:45:30:10:10$
- A6  $ZnO:B_2O_3:SiO_2:CaO:Al_2O_3 = 30:28:32:5:5$
- *A7  $ZnO:B_2O_3:SiO_2:SrO:Al_2O_3 = 5:45:30:10:10$
- *A8  $ZnO:B_2O_3:SiO_2:BaO:Al_2O_3 = 5:45:30:10:10$
- *A9  $ZnO:B_2O_3:SiO_2:CaO:SrO:Al_2O_3 = 5:45:30:5:5:10$ Second glass sample no.

- B1  $MnO:CaO:B_2O_3:SiO_2 = 10:32:34:24$
- B2  $MnO:CaO:B_2O_3:SiO_2 = 5:40:33:22$
- B3  $MnO:CaO:B_2O_3:SiO_2 = 20:20:36:24$
- B4  $MnO:CaO:B_2O_3:SiO_2 = 30:10:15:45$
- B5  $MnO:CaO:B_2O_3:SiO_2:Al_2O_3 = 10:30:33:22:5$
- B6  $MnO:CaO:B_2O_3:SiO_2:ZrO_2 = 10:30:40:15:5$
- B7  $MnO:CaO:B_2O_3:SiO_2:ZnO = 10:30:30:20:10$
- B8  $MnO:CaO:B_2O_3:SiO_2:(MgO, Bi_2O_3, CuO, CoO, TiO_2, V_2O_5, etc.) = 10:10:5:55:20$
- *B9  $MnO:CaO:B_2O_3:SiO_2:Al_2O_3 = 2:30:40:28:5$
- B10  $MnO:SrO:B_2O_3:SiO_2 = 10:32:34:24$
- B11  $MnO:BaO:B_2O_3:SiO_2 = 10:32:34:24$
- B12  $MnO:CaO:SrO:B_2O_3:SiO_2 = 10:12:20:34:24$ (Preparation of Organic Vehicle)

Ethyl cellulose was prepared as the binder resin, terpineol was used as the solvent, and the solvent was dissolved in the binder resin while heating and stirring to prepare an organic vehicle. The organic vehicle included the binder resin in an amount of 8 parts by weight, the solvent in an amount of 90 parts by weight, and the dispersant in an amount of 2 parts by weight as another ingredient.

(Selection of Additive)

As the additive, as shown in the later explained Table 2, a combination of CuO and various oxides was used.

(Preparation of Resistor Paste)

A powder of the conductive material, a glass powder, an additive, and an organic vehicle prepared as explained above, were weighed to give the different compositions which were then kneaded by a three roll mill to obtain a resistor paste.

The weight ratio of the total weight of the powder of the glass composition and additives and the organic vehicle was adjusted in the range of 1:0.25 to 1:4 so that the obtained paste had a viscosity suitable for screen printing to prepare various combinations of Resistor Paste Samples 1 to 31 as shown in Table 2. Table 2 describes the types of the conductive materials, their vol %, the combinations of the first glass composition and the second glass composition, the ratios by volume and total vol %, the types of the additives, and their vol %. Note that a table in the case of converting the values converted to vol % described in Table 2 to wt % is shown together in Table 3. In Tables 2 to 3, samples outside the range of the present invention are marked by asterisks.

TABLE 2

| Sample no. | Conductive material Type | vol % | Glass composition 1st type | 2nd type | Ratio by vol. 1st:2nd | Total vol % | Additives Type | vol % |
|---|---|---|---|---|---|---|---|---|
| *1 | $RuO_2$ | 27 | *None | B1 | 0:10 | 71 | CuO | 2 |
| *2 | $RuO_2$ | 23 | A1 | *None | 10:0 | 75 | CuO | 2 |
| *3 | $RuO_2$ | 23 | A1 | *None | 10:0 | 70 | CuO | 2 |
|  |  |  |  |  |  |  | $MnO_2$ | 5 |
| *4 | $RuO_2$ | 23 | A1 | B1 | 5:5 | 77 | CuO | *0 |
| *5 | $RuO_2$ | 23 | A1 | *B9 | 5:5 | 75 | CuO | 2 |
| *6 | $RuO_2$ | 23 | *A5 | B1 | 5:5 | 75 | CuO | 2 |
| 7 | $RuO_2$ | 23 | A1 | B1 | 5:5 | 75 | CuO | 2 |
| 8 | $RuO_2$ | 23 | A2 | B1 | 5:5 | 75 | CuO | 2 |
| 9 | $RuO_2$ | 23 | A3 | B1 | 5:5 | 75 | CuO | 2 |
| 10 | $RuO_2$ | 23 | A4 | B1 | 5:5 | 75 | CuO | 2 |
| 11 | $RuO_2$ | 23 | A1 | B2 | 5:5 | 75 | CuO | 2 |
| 12 | $RuO_2$ | 23 | A1 | B3 | 5:5 | 75 | CuO | 2 |
| 13 | $RuO_2$ | 23 | A1 | B4 | 5:5 | 75 | CuO | 2 |
| 14 | $RuO_2$ | 23 | A1 | B5 | 5:5 | 75 | CuO | 2 |
| 15 | $RuO_2$ | 23 | A1 | B6 | 5:5 | 75 | CuO | 2 |
| 16 | $RuO_2$ | 23 | A1 | B7 | 5:5 | 75 | CuO | 2 |
| 17 | $RuO_2$ | 23 | A1 | B8 | 5:5 | 75 | CuO | 2 |
| 18 | $RuO_2$ | 23 | A1 | B1 | 8:2 | 72 | CuO | 5 |
| 19 | $RuO_2$ | 25 | A1 | B1 | 2:8 | 73 | CuO | 2 |
| 20 | $RuO_2$ | 25 | A1 | B1 | 6:4 | 74 | CuO | 1 |
| 21 | $RuO_2$ | 23 | A1 | B1 | 7:3 | 71 | CuO | 2 |
|  |  |  |  |  |  |  | $MnO_2$ | 4 |
| 22 | $RuO_2$ | 23 | A1 | B1 | 7:3 | 70 | CuO | 2 |
|  |  |  |  |  |  |  | $TiO_2$ | 5 |
| 23 | $RuO_2$ | 8 | A1 | B1 | 6:4 | 90 | CuO | 2 |
| 24 | $RuO_2$ | 33 | A1 | B1 | 4:6 | 65 | CuO | 2 |
| 25 | $RuO_2$ | 23 | A6 | B1 | 5:5 | 75 | CuO | 2 |
| *26 | $RuO_2$ | 23 | *A7 | B1 | 5:5 | 75 | CuO | 2 |
| *27 | $RuO_2$ | 23 | *A8 | B1 | 5:5 | 75 | CuO | 2 |
| *28 | $RuO_2$ | 23 | *A9 | B1 | 5:5 | 75 | CuO | 2 |
| 29 | $RuO_2$ | 23 | A1 | B10 | 5:5 | 75 | CuO | 2 |
| 30 | $RuO_2$ | 23 | A1 | B11 | 5:5 | 75 | CuO | 2 |
| 31 | $RuO_2$ | 23 | A1 | B12 | 5:5 | 75 | CuO | 2 |

TABLE 3

| Sample no. | Conductive material Type | wt % | Glass composition First Type | wt % | Second Type | wt % | Weight ratio 1st:2nd | Total wt % | Additives Type | wt % |
|---|---|---|---|---|---|---|---|---|---|---|
| *1 | $RuO_2$ | 47.41 | *None | — | B1 | 49.37 | 0:10 | 49.37 | CuO | 3.22 |
| *2 | $RuO_2$ | 44.46 | A1 | 52.00 | *None | — | 10:0 | 52.00 | CuO | 3.55 |
| *3 | $RuO_2$ | 42.71 | A1 | 46.63 | *None | — | 10:0 | 46.63 | CuO | 3.41 |
|  |  |  |  |  |  |  |  |  | $MnO_2$ | 7.25 |
| *4 | $RuO_2$ | 44.18 | A1 | 26.53 | B1 | 29.29 | 4.8:5.2 | 55.82 | CuO | *0 |
| *5 | $RuO_2$ | 43.42 | A1 | 25.39 | *B9 | 27.73 | 4.8:5.2 | 53.12 | CuO | 3.47 |

TABLE 3-continued

| Sample no. | Conductive material Type | wt % | Glass composition First Type | wt % | Second Type | wt % | Weight ratio 1st:2nd | Total wt % | Additives Type | wt % |
|---|---|---|---|---|---|---|---|---|---|---|
| *6 | RuO$_2$ | 42.34 | *A5 | 26.94 | B1 | 27.34 | 5:5 | 54.28 | CuO | 3.38 |
| 7 | RuO$_2$ | 43.28 | A1 | 25.31 | B1 | 27.95 | 4.8:5.2 | 53.26 | CuO | 3.46 |
| 8 | RuO$_2$ | 40.57 | A2 | 29.99 | B1 | 26.20 | 5.3:4.7 | 56.19 | CuO | 3.24 |
| 9 | RuO$_2$ | 40.00 | A3 | 30.97 | B1 | 25.83 | 5.5:4.5 | 56.80 | CuO | 3.19 |
| 10 | RuO$_2$ | 38.98 | A4 | 32.74 | B1 | 25.17 | 5.7:4.3 | 57.90 | CuO | 3.11 |
| 11 | RuO$_2$ | 43.15 | A1 | 25.24 | B2 | 28.16 | 4.7:5.3 | 53.40 | CuO | 3.45 |
| 12 | RuO$_2$ | 42.64 | A1 | 24.93 | B3 | 29.02 | 4.6:5.4 | 53.96 | CuO | 3.40 |
| 13 | RuO$_2$ | 42.26 | A1 | 24.71 | B4 | 29.66 | 4.5:5.5 | 54.37 | CuO | 3.37 |
| 14 | RuO$_2$ | 42.72 | A1 | 24.98 | B5 | 28.88 | 4.6:5.4 | 53.87 | CuO | 3.41 |
| 15 | RuO$_2$ | 42.38 | A1 | 24.79 | B6 | 29.45 | 4.6:5.4 | 54.23 | CuO | 3.38 |
| 16 | RuO$_2$ | 42.09 | A1 | 24.62 | B7 | 29.93 | 4.5:5.5 | 54.55 | CuO | 3.36 |
| 17 | RuO$_2$ | 43.33 | A1 | 25.34 | B8 | 27.87 | 4.8:5.2 | 53.21 | CuO | 3.46 |
| 18 | RuO$_2$ | 44.92 | A1 | 40.35 | B1 | 11.14 | 7.8:2.2 | 51.49 | CuO | 3.59 |
| 19 | RuO$_2$ | 45.29 | A1 | 9.49 | B1 | 41.89 | 1.8:8.2 | 51.38 | CuO | 3.33 |
| 20 | RuO$_2$ | 46.67 | A1 | 29.73 | B1 | 21.88 | 5.8:4.2 | 51.61 | CuO | 1.71 |
| 21 | RuO$_2$ | 41.82 | A1 | 32.41 | B1 | 15.34 | 6.8:3.2 | 47.75 | CuO MnO$_2$ | 3.34 7.10 |
| 22 | RuO$_2$ | 42.76 | A1 | 32.67 | B1 | 15.46 | 6.8:3.2 | 48.13 | CuO TiO$_2$ | 3.41 5.69 |
| 23 | RuO$_2$ | 18.41 | A1 | 44.57 | B1 | 32.80 | 5.8:4.2 | 77.37 | CuO | 4.23 |
| 24 | RuO$_2$ | 55.36 | A1 | 15.65 | B1 | 25.91 | 3.8:6.2 | 41.55 | CuO | 3.08 |
| 25 | RuO$_2$ | 40.69 | A6 | 29.79 | B1 | 26.27 | 5.3:4.7 | 56.06 | CuO | 3.25 |
| *26 | RuO$_2$ | 41.93 | *A7 | 27.66 | B1 | 27.07 | 5.1:4.9 | 54.73 | CuO | 3.35 |
| *27 | RuO$_2$ | 41.28 | *A8 | 28.77 | B1 | 26.65 | 5.2:4.8 | 55.43 | CuO | 3.30 |
| *28 | RuO$_2$ | 42.13 | *A9 | 27.30 | B1 | 27.20 | 5:5 | 54.50 | CuO | 3.36 |
| 29 | RuO$_2$ | 41.64 | A1 | 24.35 | B10 | 30.68 | 4.4:5.6 | 55.03 | CuO | 3.32 |
| 30 | RuO$_2$ | 39.67 | A1 | 23.20 | B11 | 33.96 | 4.1:5.9 | 57.16 | CuO | 3.17 |
| 31 | RuO$_2$ | 42.13 | A1 | 24.64 | B12 | 29.86 | 4.5:5.5 | 54.50 | CuO | 3.36 |

(Preparation of Resistors and Measurement of Resistance Values)

An Ag—Pt conductor paste was screen printed and dried in a predetermined shape on a dielectric substrate having BaTiO$_3$ as a main ingredient. The Ag in the Ag—Pt conductor paste was contained in an amount of 95 wt %, while the Pt was contained in an amount of 5 wt %. The dielectric substrate was placed in a belt furnace and fired on by a pattern of one hour from carrying in to carrying out. Temperature was 850° C. and the holding time was 10 minutes. The dielectric substrate thus formed with the conductor was screen printed and dried with each resistor paste prepared as explained above in a predetermined shape. The resistor paste was fired on by the same conditions as the conductor firing to obtain a thick film resistor.

(Evaluation of Characteristics of Resistors)

Each resistor sample obtained from the resistor pastes shown in Table 2 were measured for its sheet resistance (Ω/□). The sheet resistance was measured by a Product No. 34401A made by Agilent Technologies.

The TCR (temperature coefficient of resistance) is the rate of change of the resistance when changing the temperature to 125° C. from the standard room temperature of 25° C. For example, if the resistance values at 25° C. and 125° C. are R25 and R125 (Ω/□), the TCR is found from the following equation (1):

$$TCR(ppm/° C.)=(R25-R125)/R25/100\times 1000000 \quad (1)$$

Samples which satisfy the standard of TCR <±250 ppm/° C. are judged superior in temperature coefficient of resistance. The results are shown in Table 4. In Table 4, samples which do not satisfy the standard are marked by asterisks.

For the reliability characteristic (flux resistance), the resistor is coated with flux, then heat treated at 310° C. for 1 minute, then the flux is washed off. The rate of change in the resistance before and after treatment is then found. Samples which satisfy the standard of reliability characteristic <±1.0% are judged superior in reliability characteristic. The results are shown in Table 4. In Table 4, samples which do not satisfy the standard are marked by asterisks.

TABLE 4

| Sample No. | Sheet resistance value (Ω/□) | TCR ppm/° C. | Reliability characteristic % |
|---|---|---|---|
| *1 | 70 | −170 | *4.3 |
| *2 | 10 | *1400 | *0.3 |
| *3 | 50 | *700 | *1.5 |
| *4 | 140 | −60 | *5.5 |
| *5 | 280 | *300 | *1.3 |
| *6 | 120 | *500 | *1.5 |
| 7 | 100 | −60 | 0.3 |
| 8 | 200 | −105 | 0.5 |
| 9 | 150 | −200 | 0.4 |
| 10 | 250 | −150 | 0.5 |
| 11 | 80 | 160 | 0.3 |
| 12 | 170 | −150 | 0.4 |
| 13 | 240 | −195 | 0.5 |
| 14 | 90 | 70 | 0.3 |
| 15 | 115 | −70 | 0.2 |
| 16 | 60 | 130 | 0.2 |
| 17 | 130 | 150 | 0.5 |
| 18 | 15 | 195 | 0.1 |
| 19 | 250 | −200 | 0.4 |
| 20 | 30 | 200 | 0.8 |
| 21 | 125 | −150 | 0.9 |
| 22 | 245 | −180 | 0.9 |
| 23 | 250 | −195 | 0.4 |
| 24 | 10 | 175 | 0.9 |
| 25 | 160 | 220 | 0.7 |

TABLE 4-continued

| Sample No. | Sheet resistance value (Ω/□) | TCR ppm/° C. | Reliability characteristic % |
|---|---|---|---|
| *26 | 150 | *420 | *2.0 |
| *27 | 260 | *360 | *6.8 |
| *28 | 135 | *550 | *1.8 |
| 29 | 85 | −70 | 0.7 |
| 30 | 110 | −85 | 0.8 |
| 31 | 95 | −65 | 0.6 |

As shown in Table 4, compared with Sample Nos. 1 to 6 and Sample Nos. 26 to 28 outside the range of the present invention, according to Sample Nos. 7 to 25 and Sample Nos. 29 to 31 of examples of the present invention, it could be confirmed that there is a relatively low resistance value of 10 to 300 Ω/□, the absolute value of the TCR is a small 250 ppm/° C. or less, and the reliability characteristic is held down to less than 1.0%.

Note that it could be confirmed that particularly good results are obtained when the ratio by volume of the first glass composition and the second glass composition is first:second=8:2 to 2:8 and that addition of CuO can deteriorate the reliability characteristic.

INDUSTRIAL APPLICABILITY

According to the present invention, it is possible to obtain a lead-free resistor having a predetermined low resistance value (not particularly limited, but for example 10 to 300 Ω/□ or so) while being low in the absolute value of the temperature coefficient of resistance (TCR) of the resistance value and excellent in the reliability characteristic (flux resistance) when for example formed on a dielectric substrate having barium titanate as a main ingredient.

The invention claimed is:

1. A resistor paste comprised of a first glass composition substantially not including lead, a second glass composition substantially not including lead of a composition different from said first glass composition, and a conductive material substantially not including lead mixed with an organic vehicle, said resistor paste characterized in that:

the resistor paste further includes CuO as an additive other than the first glass composition and the second glass composition, said first glass composition includes ZnO in an amount of at least 10 mol % and at least one component selected from CaO, SrO, and BaO in an amount of less than 10 mol % (including 0), said second glass composition includes MnO in an amount of at least 5 mol % and at least one component selected from CaO, SrO, and BaO in an amount of at least 10 mol %, and the total percent by volume of said first glass composition and second glass composition is 65 to 89 vol % when the volume of the powder of the total of the conductive material, first glass composition, second glass composition, and additives is 100 and the percent by volume of said conductive material is 8 to 33 vol %.

2. The resistor paste as set forth in claim 1, characterized in that said first glass composition includes ZnO in an amount of at least 10 mol % and not more than 40 mol %, $B_2O_3$ in an amount of at least 1 mol % and not more than 40 mol %, $SiO_2$ in an amount of at least 15 mol % and not more than 60 mol %, at least one compound selected from CaO, SrO, and BaO in an amount of less than 10 mol % (including 0), and a total of any other first oxides in an amount of not more than 30 mol % (including 0), and said second glass composition includes MnO in an amount of at least 5 mol % and not more than 20 mol %, at least one compound selected from CaO, SrO, and BaO in an amount of at least 10 mol % and not more than 40 mol %, $B_2O_3$ in an amount of at least 5 mol % and not more than 40 mol %, $SiO_2$ in an amount of at least 15 mol % and not more than 55 mol %, and a total of any other second oxides in an amount of not more than 20 mol % (including 0).

3. The resistor paste as set forth in claim 2, characterized in that said any other first oxides in the first glass composition is at least one oxide selected from $Al_2O_3$, $Na_2O$, $K_2O$, $ZrO_2$, MgO, $Bi_2O_3$, $P_2O_5$, $TiO_2$, CuO, CoO, and $V_2O_5$ and in that the total of said first oxides is not more than 29 mol % (including 0) with respect to the mol % of the first glass composition with respect to the whole.

4. The resistor paste as set forth in claim 2, characterized in that said any other second oxides in the second glass composition is at least one oxide selected from $Al_2O_3$, $ZrO_2$, ZnO, MgO, $Bi_2O_3$, $TiO_2$, CuO, CoO, and $V_2O_5$ and in that the total of said second oxides is not more than 20 mol % (including 0) with respect to the total mol % of the second glass composition.

5. The resistor paste as set forth in claim 1, characterized in that the ratio by volume of the first glass composition and the second glass composition included in said resistor paste is 8:2 to 2:8.

6. The resistor paste as set forth in claim 1, characterized by further including CuO as an additive other than said first glass composition and second glass composition and in that a percent of addition by volume of CuO to the volume of the powder of the total of the conductive material, first glass composition, second glass composition, and additives is over 0 vol % and not more than 5 vol %.

7. The resistor paste as set forth in claim 1, characterized by further including $MnO_2$ and/or $TiO_2$ as said additive and in that a percent of addition by volume of $MnO_2$ and/or $TiO_2$ is at least 0 vol % and not more than 5 vol % with respect to the volume of the powder of the total of the conductive material, first glass composition, second glass composition, and additives.

8. The resistor paste as set forth in claim 5, characterized by containing CuO in an amount of at least 1 vol % and not more than 3 vol % and $MnO_2$ in an amount of at least 0 vol % and not more than 5 vol % with respect to the volume of the powder of the total of the conductive material, first glass composition, second glass composition, and additives.

9. The resistor paste as set forth in claim 1, characterized in that said conductive material is $RuO_2$ or a compound oxide of Ru.

10. The resistor paste as set forth in claim 1, characterized in that a ratio by weight of the weight of the powder of the total of said conductive material, first glass composition, second glass composition, and additives and organic vehicle is within a range of 1:0.25 to 1:4.

11. The resistor formed using a resistor paste as set forth in claim 1.

12. The electronic device having a resistor as set forth in claim 11.

13. A resistor paste comprised of a first glass composition substantially not including lead, a second glass composition substantially not including lead of a composition different from said first glass composition, and a conductive material substantially not including lead mixed with an organic vehicle, said resistor paste characterized in that:
the resistor paste further includes CuO as an additive other than the first glass composition and the second glass composition,
said first glass composition includes ZnO in an amount of at least 10 mol % and at least one component selected from CaO, SrO, and BaO in an amount of less than 10 mol % (including 0),
said second glass composition includes MnO in an amount of at least 5 mol % and at least one component selected from CaO, SrO, and BaO in an amount of at least 10 mol %, and
the total percent by weight of said first glass composition and second glass composition is 41.55 to 77.37 wt % when the weight of the powder of the total of the conductive material, first glass composition, second glass composition, and additives is 100 and the percent by weight of said conductive material is 18.41 to 55.36 wt %.

14. The resistor paste as set forth in claim 13, characterized in that
said first glass composition includes ZnO in an amount of at least 10 mol % and not more than 40 mol %, $B_2O_3$ in an amount of at least 1 mol % and not more than 40 mol %, $SiO_2$ in an amount of at least 15 mol % and not more than 60 mol %, at least one compound selected from CaO, SrO, and BaO in an amount of less than 10 mol % (including 0), and a total of any other first oxides in an amount of not more than 30 mol % (including 0), and said second glass composition includes MnO in an amount of at least 5 mol % and not more than 20 mol %, at least one compound selected from CaO, SrO, and BaO in an amount of at least 10 mol % and not more than 40 mol %, $B_2O_3$ in an amount of at least 5 mol % and not more than 40 mol %, $SiO_2$ in an amount of at least 15 mol % and not more than 55 mol %, and a total of any other second oxides in an amount of not more than 20 mol % (including 0).

15. The resistor paste as set forth in claim 13, characterized in that the ratio by weight of the first glass composition and the second glass composition included in said resistor paste is 7.8:2.2 to 1.8:8.2.

16. The resistor paste as set forth in claim 15, characterized by further including CuO as an additive other than said first glass composition and second glass composition and in that a percent of addition by weight of CuO to the weight of the powder of the total of the conductive material, first glass composition, second glass composition, and additives is 0 to 4.23 wt % (excluding 0 wt %).

17. The resistor paste as set forth in claim 13, characterized by further including $MnO_2$ and/or $TiO_2$ as said additive and in that a percent of addition by weight of $MnO_2$ and/or $TiO_2$ is 0 to 7.25 wt % with respect to the weight of the powder of the total of the conductive material, first glass composition, second glass composition, and additives.

18. The resistor paste as set forth in claim 17, characterized by containing CuO in an amount of 1.71 to 3.59 wt % and $MnO_2$ in an amount of 0 to 7.25 wt % with respect to the weight of the powder of the total of the conductive material, first glass composition, second glass composition, and additives.

* * * * *